(12) United States Patent
Chen

(10) Patent No.: US 7,302,874 B2
(45) Date of Patent: Dec. 4, 2007

(54) HANDLEBAR GEAR SHIFTER FOR BICYCLE

(76) Inventor: Po-Cheng Chen, No. 66, Sec. 4, Chung-Ching N. Road, Taipei (TW)

( * ) Notice: Subject to any disclaimer, the term of this patent is extended or adjusted under 35 U.S.C. 154(b) by 687 days.

(21) Appl. No.: 10/803,846

(22) Filed: Aug. 3, 2004

(65) Prior Publication Data

US 2005/0081672 A1 Apr. 21, 2005

(30) Foreign Application Priority Data

Oct. 16, 2003 (TW) .............................. 92218407 U

(51) Int. Cl.
 *F16C 1/10* (2006.01)
(52) U.S. Cl. .................. 74/502.2; 74/489; 74/505; 74/506
(58) Field of Classification Search ............... 74/502.2, 74/489, 505, 506, 508, 488, 486
See application file for complete search history.

(56) References Cited

U.S. PATENT DOCUMENTS

| | | | | |
|---|---|---|---|---|
| 5,588,925 A | * | 12/1996 | Arbeiter et al. | ................ 474/81 |
| 5,676,020 A | * | 10/1997 | Jordan et al. | ............ 74/473.14 |
| 6,494,112 B2 | | 12/2002 | Chen | ........................... 74/501 |
| 6,557,435 B2 | * | 5/2003 | Ose | ............................. 74/502.2 |
| 6,604,440 B2 | * | 8/2003 | Wessel et al. | .............. 74/502.2 |
| 6,829,963 B2 | * | 12/2004 | Liao | .......................... 74/502.2 |

* cited by examiner

*Primary Examiner*—David M. Fenstermacher

(57) ABSTRACT

A handlebar gear shifter for a bicycle includes a tabular handlebar having a support plate extending from an end of the handlebar at the top of the peripheral thereof. A sleeve is rotatably mounted to the handlebar. A fan-shaped mediate member has an end pivotally connected onto the support plate. A first cable has one end thereof engaged with a recess in the sleeve and the other end of the first cable is engaged with the mediate member. A second cable connects between the mediate member and a derailleur mechanism. A C-shaped member having notches is connected to the handlebar. A spring member is engaged with the sleeve. An index member is biased by the spring member and removably engaged with one of the notches. The improvement is that the distance between the pivot end of the fan-shaped mediate member and one distal end thereof connected to the first cable is approximately equal to or slightly less than that between the pivot end and the other distal end thereof connected to the second cable, so that the traveling distance of the first cable is less than that of the second cable. Therefore, the traveling distance of the first cable and thus the rotated angle of the sleeve can be shorted for each gearshift that is more convenient for operation.

2 Claims, 7 Drawing Sheets

HANDLEBAR GEAR SHIFTER FOR BICYCLE

BACKGROUND OF THE INVENTION

1. Field of the Invention

The present invention relates to a handlebar gear shifter for pulling or releasing a cable of a bicycle derailleur mechanism.

2. The Related Art

There are various types of bicycle gear shifters available in the market. Whatever automatic or manual gear shifters, the fundamental principle of gear shifting is to pull or release a cable, which connects the gear shifter to a bicycle derailleur mechanism, to change the position of a bicycle chain on a gear assembly for realizing gear shifting. However, for those gear shifters, a rider has to remove his/her hand from the handlebar to the shifting device in case of gearshift, and the removal of the hand could cause an unstable for controlling the bicycle even a falling down. Referring to FIG. 1, which shows a conventional handlebar gear shifter, a rider has no need to remove the hand from the handlebar to the gear shifter when shifting a gear. A cable C of the conventional handlebar gear shifter is directly connected through a cable-guidance A to a recess of a sleeve B. When turning the sleeve B, it thus directly pulls or releases the cable C, which is connected to a bicycle derailleur mechanism, for shifting the gear. However, because the wire-guidance A with a larger curve contacts with the cable C that causes a larger friction drag, a rider has to apply a larger force to shift gear. It is very inconvenient for operation and the cable C is easily broken after many repeated operations.

In view of the above problem, U.S. Pat. No. 6,494,112 B2 filed by the present inventor, discloses a handlebar gear shifter comprising a sleeve rotatably mounted to a handlebar from which a support plate extends. An L-shaped mediate member has an end pivotally connected onto the support plate. A first cable has one end thereof engaged with a recess in the sleeve and the other end of the first cable is engaged with the mediate member. A second cable connects the mediate member and a derailleur mechanism. A C-shaped member having notches is connected to the handlebar. A spring member is engaged with the sleeve. An index member is biased by the spring member and removably engaged with one of the notches. The mediate member is pivoted by rotating the sleeve together with the mediate member to shift the gear. However, the position of the support plate is closer to the center of the handlebar, which interferes with a brake member of a bicycle and is thus inconvenient for operation. Moreover, the sleeve shall be turned a larger angle for each gearshift. It is not so easy for riders to finish all gearshifts at one time. And the numerals of gearshift indication on the handlebar respectively showing each gear are more widely distributed. The riders are hard to read the numerals. The reason is that the distance between a pivot end of the L-shaped mediate member and one distal end thereof connected to the first cable is larger than that between the pivot end and the other distal end thereof connected to the second cable. Thus, the traveling distance of the first cable is larger than that of the second cable for each gearshift. The traveling distance of the first cable shall be larger for finishing each gearshift, so that the numerals of gearshift indication on the handlebar are more widely distributed that is not easy to read for a rider.

The present invention intends to provide with a handlebar gear shifter that solves the above problems.

SUMMARY OF THE INVENTION

A handlebar gear shifter in accordance with the present invention comprises a tabular handlebar having a support plate extending from an end of the handlebar at the top of the peripheral thereof. A sleeve is rotatably mounted to the handlebar. A fan-shaped mediate member has an end pivotally connected onto the support plate. A first cable has one end thereof engaged with a recess in the sleeve and the other end of the first cable is engaged with the mediate member. A second cable connects between the mediate member and a derailleur mechanism. A C-shaped member having notches is connected to the handlebar. A spring member is engaged with the sleeve. An index member is biased by the spring member and removably engaged with one of the notches. The improvement thereof is that the distance between the pivot end of the fan-shaped mediate member and one distal end thereof connected to the first cable is approximately equal to or slightly less than that between the pivot end and the other distal end thereof connected to the second cable, so that the traveling distance of the first cable is approximately equal to or less than that of the second cable. Therefore, the traveling distance of the first cable and thus the rotated angle of the sleeve can be shorted for each gearshift that is more convenient for operation.

In comparison with a conventional handlebar gear shifter, the present invention has the following improvements:

(1) Due to the traveling distance of the first cable being shorted for each gearshift, the sleeve needs to be turned only a smaller angle for finishing a gearshift. The numerals of gearshift indication on the handlebar are thus concentrated in a narrower area that is easy to read for a rider.

(2) In view of the support plate extending from an end of the handlebar at the top of the peripheral thereof, that can prevent the support plate from interference with a brake member of a bicycle.

The present invention will be readily understood to those skilled in the art after reading the detailed description of the preferred embodiment thereof in reference to the accompanying drawings.

DETAILED DESCRIPTION OF THE PREFERRED EMBODIMENT

Figure 1:
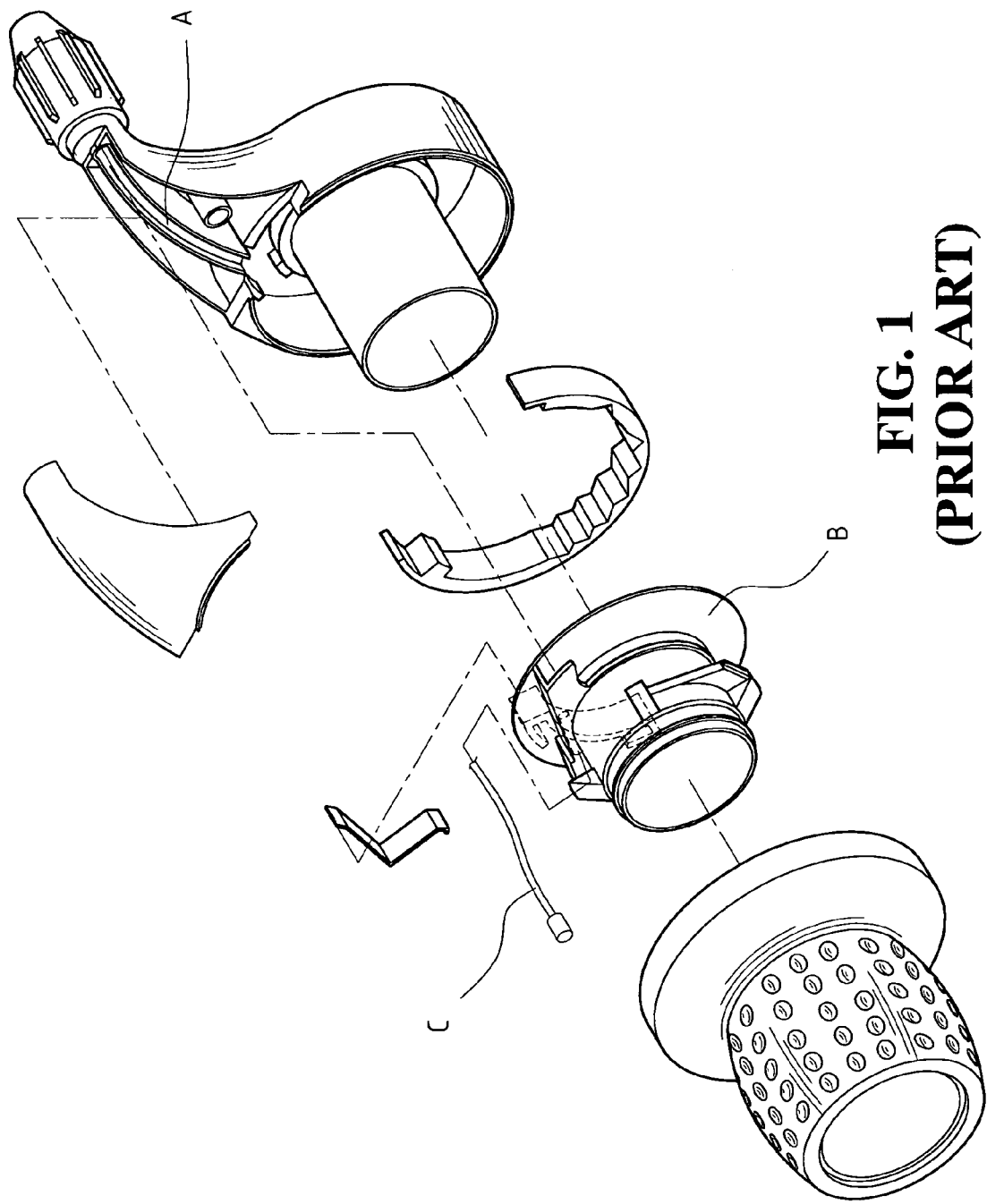
FIG. 1 is an exploded view showing a conventional handlebar gear shifter.
Figure 2:
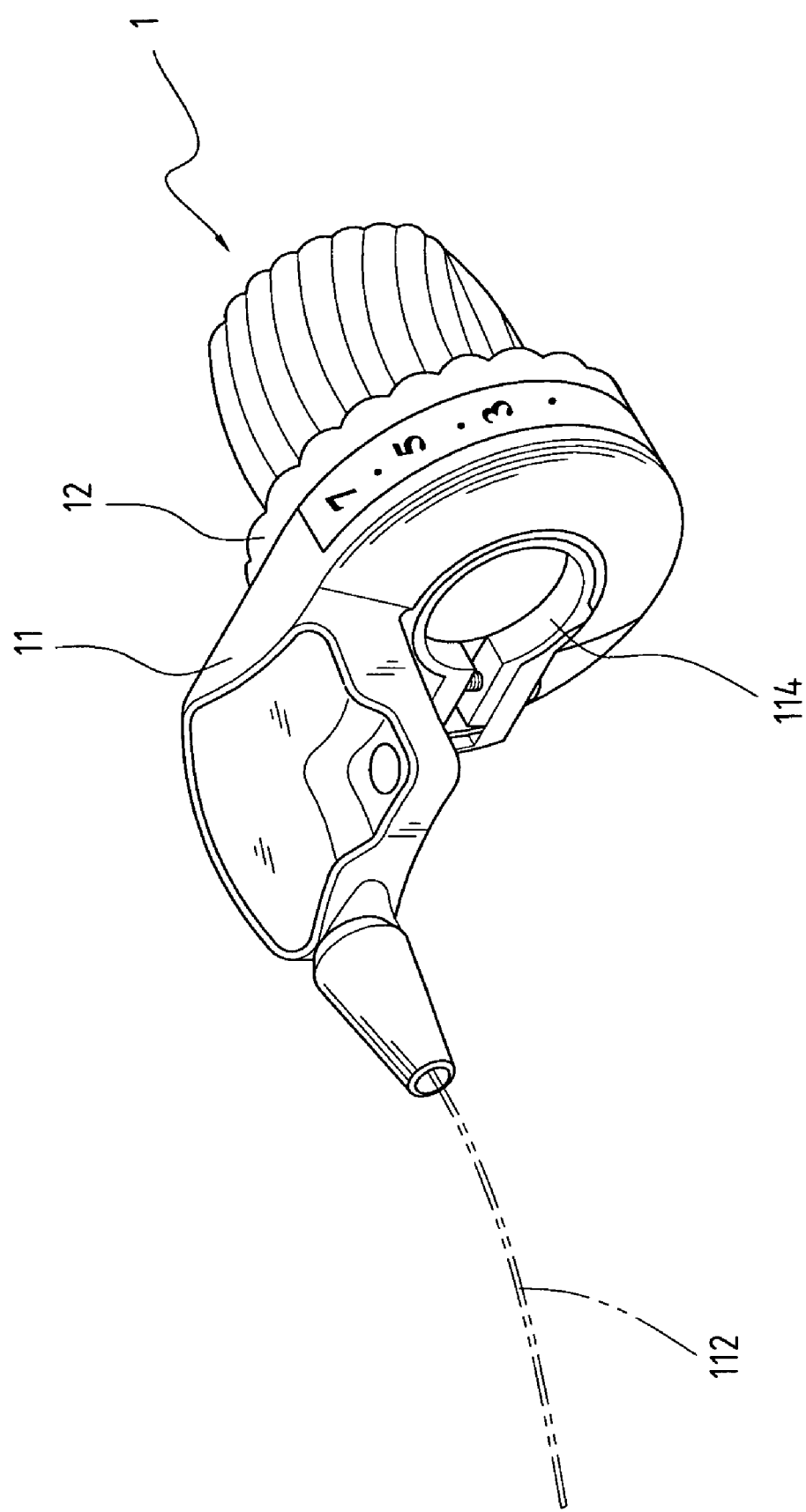
FIG. 2 is a perspective view showing a handlebar gear shifter in accordance with the present invention.
Figure 3:
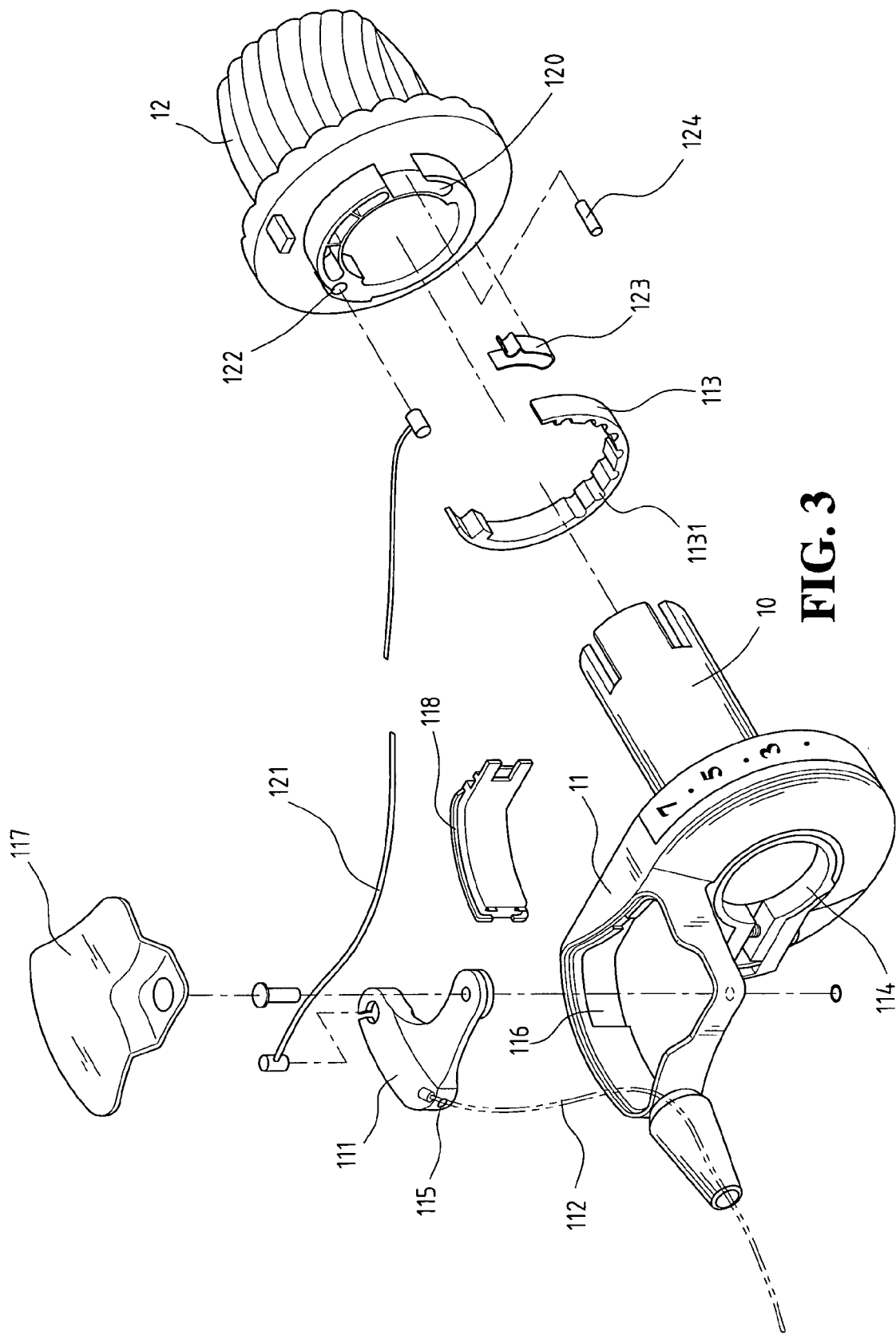
FIG. 3 is an exploded view showing a handlebar gear shifter of the present invention.
Figure 4:
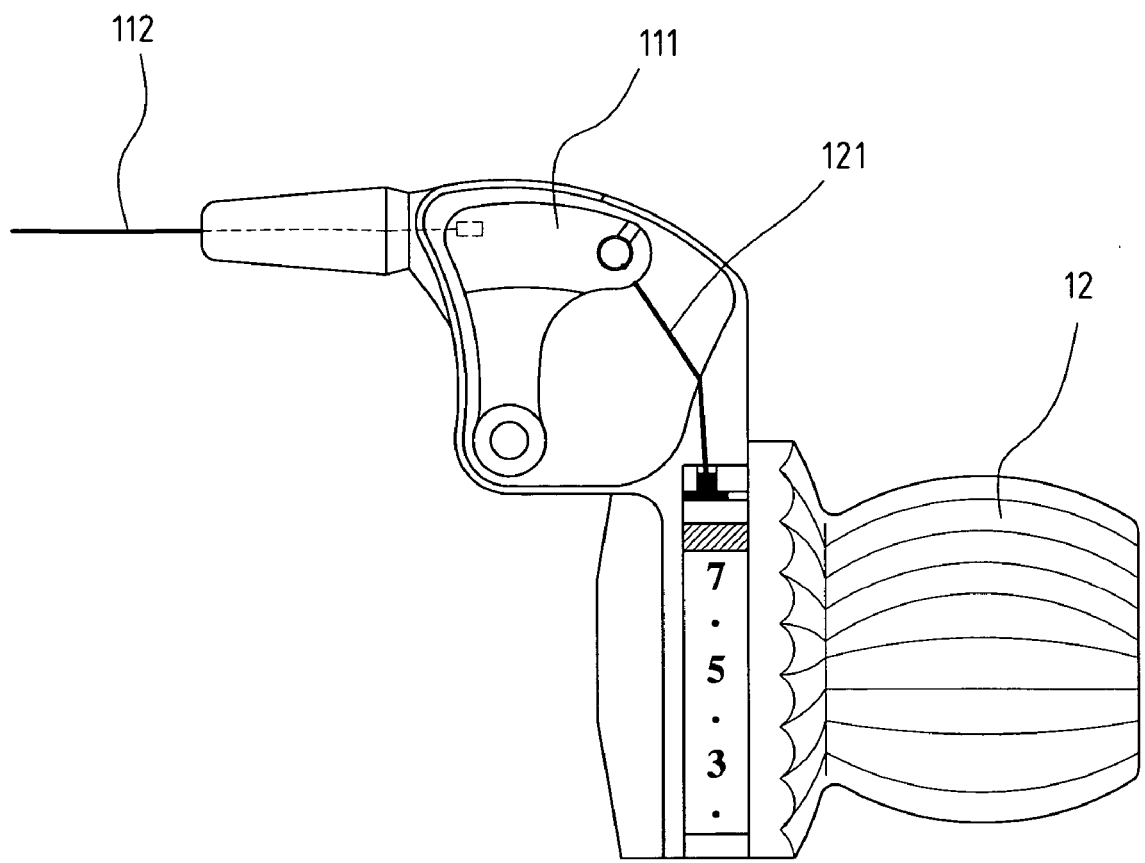
FIG. 4 shows a motion chart of the cables on the mediate member in the handlebar gear shifter of the present invention.
Figure 5:
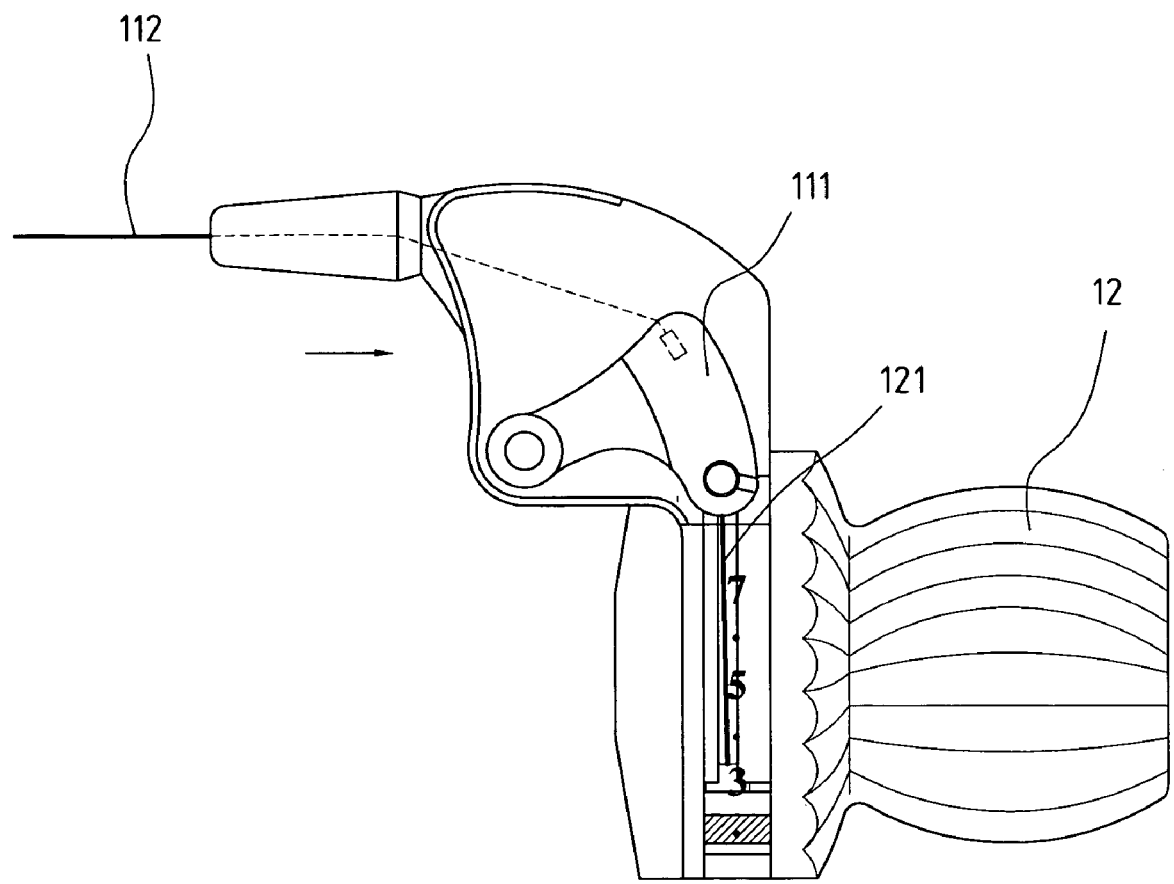
FIG. 5 shows another motion chart of the cables on the mediate member, which are pulled when the handlebar gear shifter of the present invention is rotated.
Figure 6:
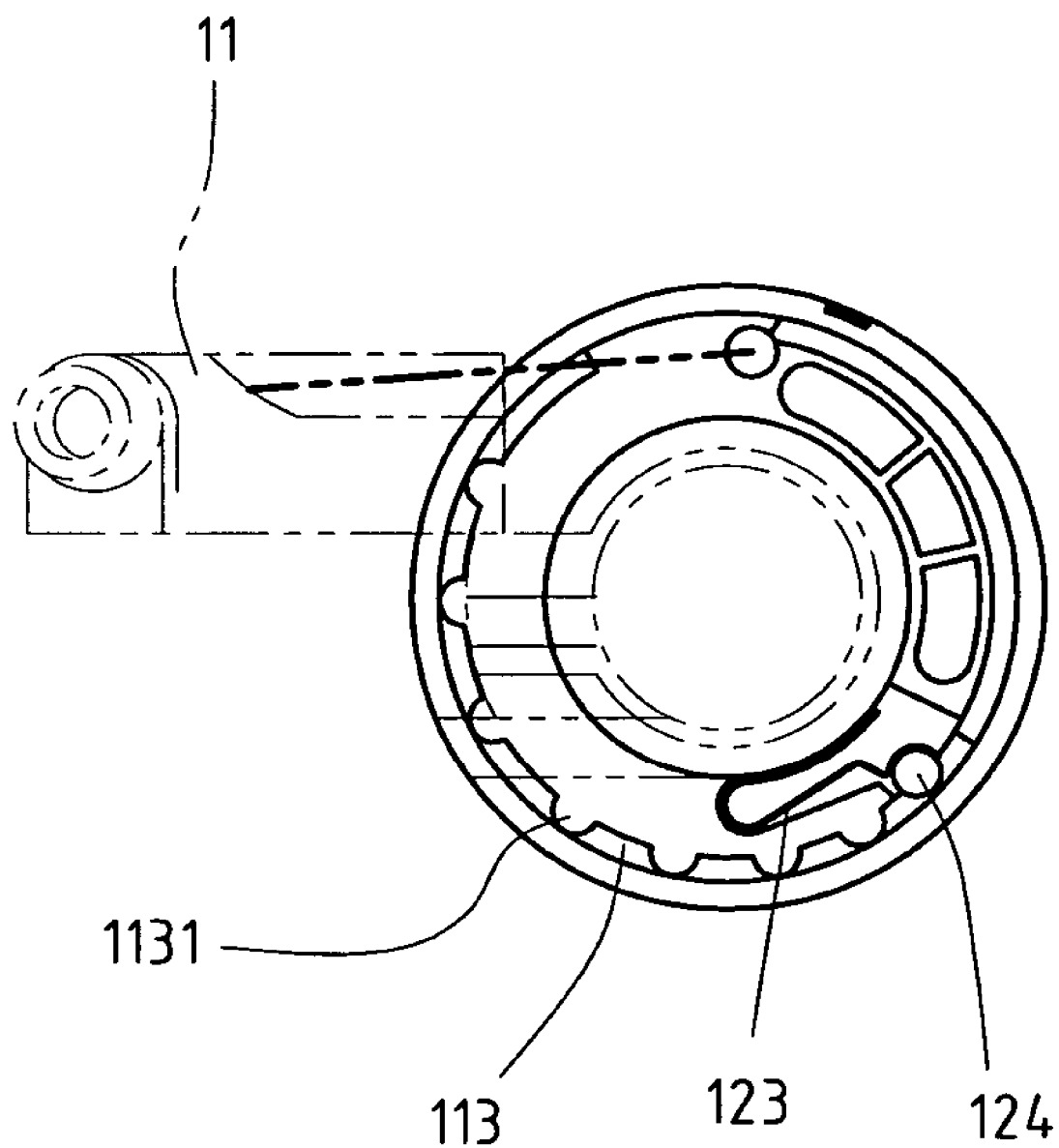
FIG. 6 is an end view showing the index member received in a notch in the handlebar gear shifter of the present invention.
Figure 7:
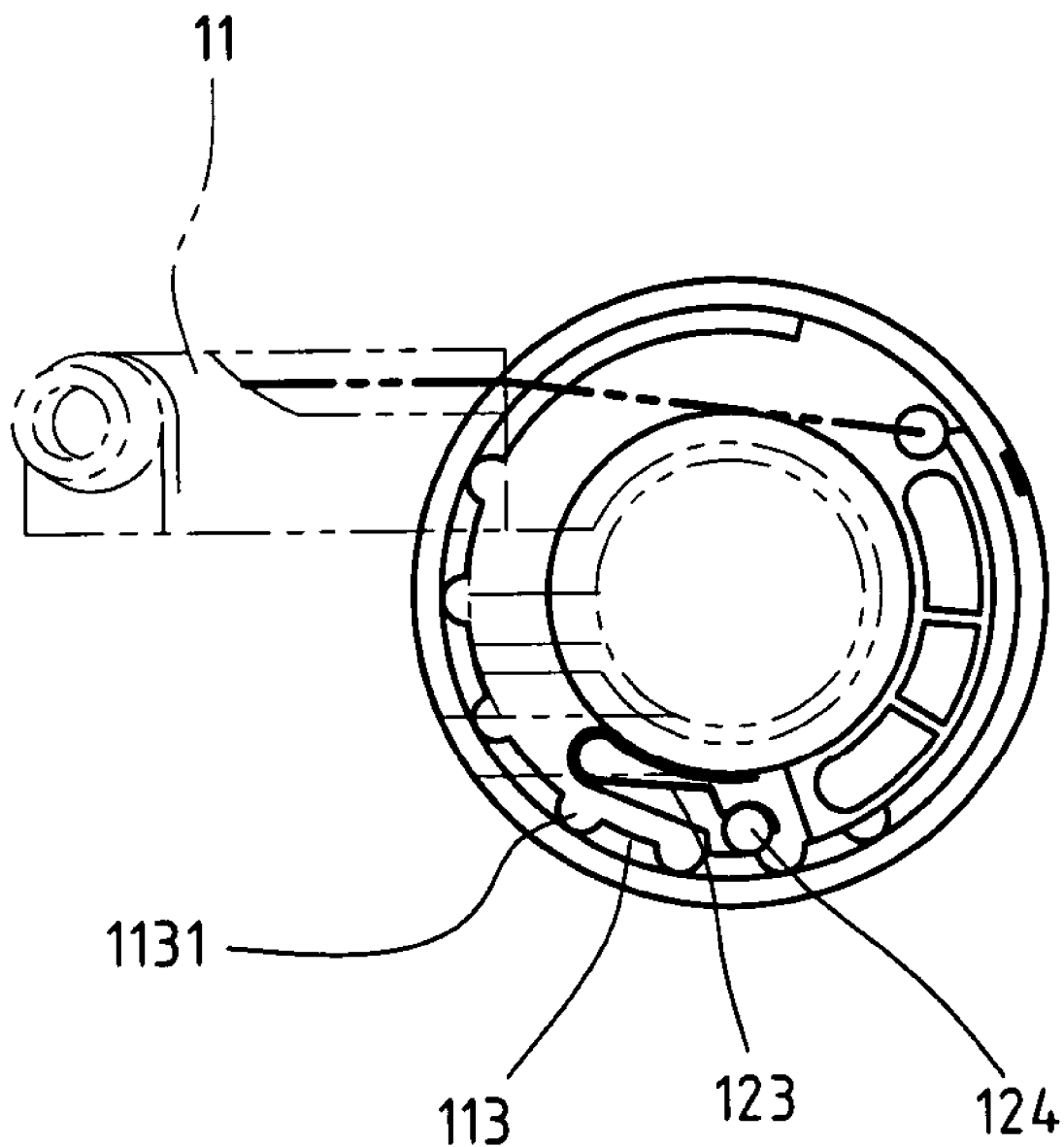
FIG. 7 shows that the index member is removed from one of notches when the handlebar gear shifter of the present invention is rotated.

Referring to FIGS. 2 and 3, a handlebar gear shifter 1 for a bicycle in accordance with the present invention comprises a tubular handlebar 10 having a support plate 11 extending from an end of the handlebar 10 at the top of the peripheral thereof for preventing the support plate 11 from interference with a brake member (not shown) of a bicycle. A sleeve 12 is rotatably mounted to the handlebar 10. A clamping member 114 is used to secure the gear shifter 1 from loose from the handlebar 10 and to fix the gear shifter 1 to a bicycle handlebar. A recess 122 and a chamber 120 are formed in an end of the sleeve 12. A C-shaped member 113 has notches 1131 formed in the inside thereof and is connected to the handlebar 10. A spring member 123 is engaged with the chamber 120 of the sleeve 12. An index member 124 is biased by the spring member 123. The index member 124 is removably engaged with one of the notches 1131 when rotating the sleeve 12. The number of the notches 1131 of the C-shaped member 113 indicates the number of gearshift level, which can be determined according to the number of gear of a bicycle.

A fan-shaped mediate member 111 has an end pivotally connected onto the support plate 11. A first cable 121 has one end thereof engaged with the recess 122 in the sleeve 12 and the other end of the first cable 121 is engaged with one distal end of the mediate member 111. A second cable 112 has one end thereof engaged with the other distal end of the mediate member 111 and the other end of the second cable 112 is connected to a derailleur mechanism (not shown) of a bicycle. The improvement thereof is that the distance between the pivot end of the fan-shaped mediate member and one distal end thereof connected to the first cable is approximately equal to or less than that between the pivot end and the other distal end thereof connected to the second cable, so that the traveling distance of the first cable is approximately equal to or less than that of the second cable. Therefore, the traveling distance of the first cable can be shorted for each gearshift that is more convenient for operation. A rider only needs to rotate a smaller angle for each gearshift. And the numerals of gearshift indication on the handlebar are thus concentrated in a narrower area that is easier to read for a rider.

The support plate 11 has a cover 117 and a window 116 with a removable cap 118 faced to a hole 115 of the other distal end of the mediate member 111. When the second cable 112 is broken, it can be changed through the window 116.

Referring to FIGS. 4-7, when turning the sleeve 12, the first cable 121 is pulled, the mediate member 111 is pivoted, the second cable 112 is pulled in order, and finally, the second cable 112 activates the derailleur mechanism (not shown) of a bicycle. The index member 124 is biased by the spring member 123 and is removed from one notch 1131 to the other for finishing a gear change. By the index member 124 going up and down and entering into the notch 1131, the rider can feel the gear is changed without seeing.

The above statement is only for illustrating the preferred embodiment of the present invention, and not for giving any limitation to the scope of the present invention. It will be apparent to those skilled in this art that all equivalent modifications and changes shall fall within the scope of the appended claims and are intended to form part of this invention.

What is claimed is:

1. A handlebar gear shifter comprising a tabular handlebar having a support plate extending from an end of the handlebar; a sleeve rotatably mounted to the handlebar and a recess formed in an end of the sleeve; a fan-shaped mediate member having an end pivotally connected onto the support plate; a first cable having one end thereof engaged with the recess in the sleeve and the other end of the first cable engaged with the mediate member; a second cable having one end thereof connected to the mediate member and the other end of the second cable connected to a derailleur mechanism of a bicycle; a C-shaped member having notches formed in the inside thereof and connected to the end of handlebar; a spring member engaged with the sleeve and an index member biased by the spring member and removably engaged with one of the notches; and the improvements comprising:

a distance between the pivot end of the fan-shaped mediate member and one distal end thereof connected to the first cable being approximately equal to or slightly less than that between the pivot end and the other distal end thereof connected to the second cable; and the support plate extending from an end of the handlebar at the top of the peripheral thereof.

2. The handlebar gear shifter as claimed in claim 1, wherein the support plate has a cover and a window with a removable cap faced to a hole of the other distal end of the mediate member.

* * * * *